(12) United States Patent
Furushige et al.

(10) Patent No.: US 9,386,178 B2
(45) Date of Patent: Jul. 5, 2016

(54) ELECTRONIC DEVICE, DEVICE MANAGEMENT SYSTEM, AND RECORDING MEDIUM THAT DETECT CHANGE BY USER OPERATION IN POWER-SAVING STATE WHILE REDUCING POWER CONSUMPTION

(71) Applicant: Kyocera Document Solutions Inc., Osaka (JP)

(72) Inventors: Katsuji Furushige, Osaka (JP); Makoto Kowaka, osaka (JP); Masato Hirota, Okaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/672,041

(22) Filed: Mar. 27, 2015

(65) Prior Publication Data

US 2015/0281498 A1    Oct. 1, 2015

(30) Foreign Application Priority Data

Mar. 27, 2014 (JP) ................. 2014-065223

(51) Int. Cl.
| H04N 1/00 | (2006.01) |
| G06F 1/26 | (2006.01) |
| G06K 15/00 | (2006.01) |
| G03G 15/00 | (2006.01) |

(52) U.S. Cl.
CPC .............. *H04N 1/00904* (2013.01); *G06F 1/26* (2013.01); *G06K 15/4055* (2013.01); *H04N 1/00323* (2013.01); *H04N 1/00888* (2013.01); *G03G 15/5016* (2013.01); *H04N 2201/0094* (2013.01)

(58) Field of Classification Search
None
See application file for complete search history.

(56) References Cited

U.S. PATENT DOCUMENTS

| 5,682,547 | A | 10/1997 | Sekiya | |
| 2010/0231390 | A1 | 9/2010 | Hashimoto | |
| 2013/0321847 | A1* | 12/2013 | Eun | H04N 1/00891 358/1.14 |
| 2014/0153013 | A1* | 6/2014 | Imamura | H04N 1/00037 358/1.12 |
| 2015/0043024 | A1* | 2/2015 | Hiramatsu | H04N 1/00904 358/1.14 |

FOREIGN PATENT DOCUMENTS

| JP | 2008-160413 A | 7/2008 |
| JP | 2012-203817 A | 10/2012 |

* cited by examiner

*Primary Examiner* — Thomas D Lee
(74) *Attorney, Agent, or Firm* — James Judge

(57) ABSTRACT

An electronic device includes a plurality of blocks, a plurality of movable members, a plurality of operation detecting circuits, a plurality of state determining circuits, an electric power control circuit, and a control circuit. The movable members are located in the respective plurality of blocks and operated when the states of the plurality of block are changed. The control circuit that has an electric power mode: causing the electric power control circuit to supply the electric power to the plurality of operation detecting circuits and to cut off the supply of the electric power to the respective state determining circuits; and causing the electric power control circuit to supply the electric power to the state determining circuit corresponding to the movable member where the operation is detected in addition to the plurality of operation detecting circuits when an operation to the movable member is detected by the operation detecting circuit.

5 Claims, 9 Drawing Sheets

FIG. 2

| Device | Status | | | |
|---|---|---|---|---|
| Printer | Ready | | | |
| Scanner | Ready | | | |
| Status Message | Sleeping ... | | | |
| Source | Size | Type | Capacity | Status |
| Cassette 1 | A4 | Plain | 500 | 70% |
| Cassette 2 | A3 | Plain | 500 | 70% |

SCREEN

FIG. 3A

| Paper | | | | |
|---|---|---|---|---|
| Source | Size | Type | Capacity | Status |
| Cassette 1 | A4 | Plain | 500 | 70% |
| Cassette 2 | A3 | Plain | 500 | 30% |

⇩ Open cassette 2

| Paper | | | | |
|---|---|---|---|---|
| Source | Size | Type | Capacity | Status |
| Cassette 1 | A4 | Plain | 500 | 70% |
| Cassette 2 | A3 | Plain | 500 | No Paper |

Updated

FIG. 3B

| Paper | | | | |
|---|---|---|---|---|
| Source | Size | Type | Capacity | Status |
| Cassette 1 | A4 | Plain | 500 | 70% |
| Cassette 2 | A3 | Plain | 500 | 70% |

⇩ Open cassette 2

| Paper | | | | |
|---|---|---|---|---|
| Source | Size | Type | Capacity | Status |
| Cassette 1 | A4 | Plain | 500 | 70% |
| Cassette 2 | A3 | Plain | 500 | 70% — Not updated |

ELECTRONIC DEVICE, DEVICE MANAGEMENT SYSTEM, AND RECORDING MEDIUM THAT DETECT CHANGE BY USER OPERATION IN POWER-SAVING STATE WHILE REDUCING POWER CONSUMPTION

INCORPORATION BY REFERENCE

This application is based upon, and claims the benefit of priority from, corresponding Japanese Patent Application No. 2014-065223 filed in the Japan Patent Office on Mar. 27, 2014, the entire contents of which are incorporated herein by reference.

BACKGROUND

Unless otherwise indicated herein, the description in this section is not prior art to the claims in this application and is not admitted to be prior art by inclusion in this section.

Typical devices constituted of a plurality of constituent parts, in addition to a normal mode where every constituent part operates to provide functions, there are provided some devices having a power-saving mode that cuts off electric power supply or reduces supplied electric power to some constituent parts so as to reduce power consumption.

Even the typical device having such power-saving mode is required to appropriately reply states of the respective constituent parts of the device with respect to a query from a management device at a remote location via a network or wireless communications.

For the query from the management device, typical devices have performed followings. No reply has been made due to maintenance of the power-saving mode being placed at higher priority, a typical device has replied the past state that is not the latest state, or a typical device has replied the latest state of the respective constituent parts of the device by returning the device to the normal mode at the sacrifice of power-saving.

In contrast to this, there is provided a technique, as an intermediate state between the entire power-saving mode with the lowest power consumption and the normal mode, causes only the queried constituent parts to return from the power-saving mode (hereinafter referred to as "partial startup") among the respective constituent parts of the device, and replies the latest state with respect to the query. This ensures reduced power consumption compared with a power consumption when fully returned to the normal mode.

Further, the technique discloses a Baseboard Management Controller (BMC), which is compliant with a server management interface of an industry standard referred to as Intelligent Platform Management Interface (IPMI).

The BMC provides a failure notification function or a similar function with respect to the management device even when an Operating System (OS) of a computer is being down. The BMC always monitors hardware errors. Even when power supply to a main body of a device is turned off, an electric power is supplied to the BMC as long as a power supply cord is connected to an electric outlet, and the BMC continues monitoring.

SUMMARY

An electronic device according to an aspect of the disclosure includes a plurality of blocks, a plurality of movable members, a plurality of operation detecting circuits, a plurality of state determining circuits, an electric power control circuit, and a control circuit. The plurality of blocks each have equal to or more than two states. The plurality of movable members are located in the respective plurality of blocks and operated when the states of the plurality of block are changed. The plurality of operation detecting circuits detect the respective operations of the plurality of movable members. The plurality of state determining circuits determine the respective states of the plurality of blocks. The electric power control circuit supplies electric power to the plurality of operation detecting circuits and performs supply and cutoff of electric power to the plurality of state determining circuits. The control circuit that has an electric power mode: causing the electric power control circuit to supply the electric power to the plurality of operation detecting circuits and to cut off the supply of the electric power to the respective state determining circuits; and causing the electric power control circuit to supply the electric power to the state determining circuit corresponding to the movable member where the operation is detected in addition to the plurality of operation detecting circuits when an operation to the movable member is detected by the operation detecting circuit.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 2 illustrates a screen example displayed on an external device when information on the image forming apparatus is referenced.

FIG. 3A illustrates a screen example of a management tool when a change of a state is reflected.

FIG. 3B illustrates a screen example of the management tool when the change of the state is not reflected.

DETAILED DESCRIPTION

Figure 1:
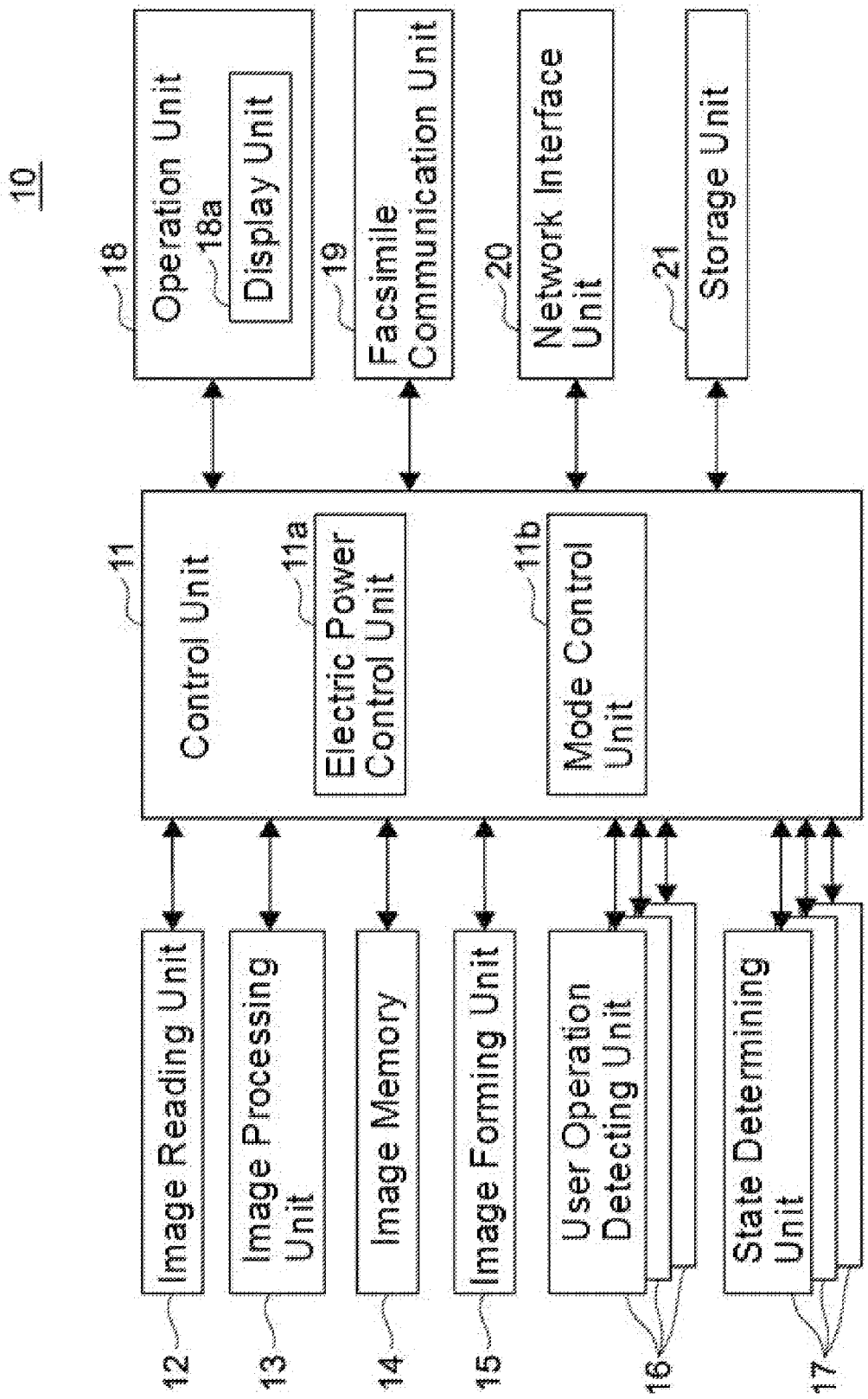
FIG. 1 schematically illustrates a configuration of an image forming apparatus according to an embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes an embodiment of the disclosure with reference to drawings. Additionally, the description will be given of an image forming apparatus (which is a Multifunction Peripheral (MFP)) as an exemplary electronic device according to the embodiment.

Configuration of Image Forming Apparatus

First, the configuration of the image forming apparatus will be described. FIG. 1 is a functional configuration diagram schematically illustrating the configuration of an image forming apparatus 10.

The image forming apparatus 10 includes a control unit 11. The control unit 11 is a circuit that is constituted of a Central Processing Unit (CPU), a Random Access Memory (RAM), a Read Only Memory (ROM), a dedicated hardware and a similar electronics component. The control unit 11 manages whole operation control of the image forming apparatus 10.

The control unit 11 is connected to an image reading unit 12, an image processing unit 13, an image memory 14, an image forming unit 15, a plurality of user operation detecting units 16 (which is also referred to as "operation detecting unit"), a plurality of state determining units 17, an operation unit 18, a facsimile communication unit 19, a network interface unit 20 (which is also referred to as "communication unit"), a storage unit 21, and similar units. The control unit 11 performs the operation control of the connected respective units (blocks) described above, and transmits and receives signals or data to/from the respective units.

The control unit 11 controls driving of mechanisms and processing necessary to execute the operation control with respect to the respective functions, such as a scanner function, a printing function, a copying function, and a facsimile transmitting/receiving function in accordance with an execution instruction of a job that is input from a user via the operation unit 18, a personal computer (PC) connected over network, or a similar input unit.

Additionally, the control unit 11 is a circuit that includes an electric power control unit 11a and a mode control unit 11b. The electric power control unit 11a and the mode control unit 11b are achieved by programs loaded to the RAM from the ROM, which is a non-transitory computer-readable recording medium, and a similar memory being executed by the CPU.

The electric power control unit 11a is a circuit that controls supply of electric power and cutoff of the supply of electric power to the respective units of the image forming apparatus 10.

The mode control unit 11b is a circuit that sets three modes (which are electric power modes) of the image forming apparatus 10 and switches the modes being set.

The three modes include:
(1) A normal mode where the electric power is being supplied to the respective units of the image forming apparatus 10;
(2) A power-saving mode where the electric power is supplied to only the user operation detecting unit 16 and the control unit 11; and
(3) An intermediate mode where the electric power is also supplied to the state determining unit 17 associated with the user operation detecting unit 16 when a specific user operation is detected by any of the user operation detecting units 16 during the power-saving mode.

Here, the specific user operation denotes, among a series of user operations to movable members (such as insertion and removal of a part in hot plug, opening and closing of a toner cover, opening and closing of a main body cover, opening and closing of a sheet feed cassette, and opening and closing of a finisher cover), the first operations to be performed (such as the removal of the part, the opening operation of the toner cover, the opening operation of the main body cover, the opening operation of the sheet feed cassette, and the opening operation of the finisher cover).

The image reading unit 12 is a scanner that reads an image from a document.

The image processing unit 13 is a circuit that performs image processing to image data of the image read by the image reading unit 12 as necessary. For example, the image processing unit 13 performs the image processing such as shading correction to improve the quality of the image after the image read by the image reading unit 12 underwent image formation.

The image memory 14 is a region where data of a document image obtained by the reading by the image reading unit 12 is temporarily stored, or data to be a print target of the image forming unit 15 is temporarily stored.

The image forming unit 15 is a circuit that performs image formation of the image data and similar data read by the image reading unit 12.

The user operation detecting unit 16 is a circuit that operates when a user performs operation with respect to the respective blocks. The user operation detecting unit 16 is installed, for example, in the toner cover (movable member) that the user opens and closes so as to replace a toner cartridge included in the image forming unit 15 and detects the opening and closing of the toner cover.

Further, the user operation detecting unit 16 may be a detecting unit that detects the operation of the user attaching and removing a paper sheet cassette (movable member) so as to replenish paper sheets for printing.

The state determining unit 17 is a circuit that is installed in each of the blocks and determines a state of each of the blocks. For example, in the case of the block of the image forming unit 15, when a remaining amount of toner is determined, the remaining amount of toner is determined after reset performance, which eliminates unevenness of the toner by stirring the toner in the toner cartridge by a motor, is performed. The reset performance means pretreatment for appropriate determination of the state of the respective blocks.

In addition and similarly, in the case of the block of the image forming unit 15, for example, when a remaining amount of paper sheets is determined, the remaining amount of paper sheets is determined after the reset performance, which lifts the paper sheets in the paper sheet cassette by a motor after the paper sheet cassette is returned to an appropriate position, is performed.

The operation unit 18 is a circuit that includes a touch panel unit and an operation key portion accepting an instruction from the user with respect to various performance and processes that the image forming apparatus 10 can execute. The touch panel unit includes a display unit 18a such as a Liquid Crystal Display (LCD) where a touch panel is located.

The facsimile communication unit 19 is a circuit that includes an encoding/decoding unit, a modulation/demodulation unit, and a Network Control Unit (NCU) and performs facsimile transmission with the use of a public telephone network.

The network interface unit 20 is a circuit that is constituted of a communication module such as a LAN board and performs transmission and reception of various data with devices in a local area (external devices such as servers and PCs) via a LAN or a similar network connected to the network interface unit 20.

The storage unit 21 includes a circuit that stores the document image and a similar image read by the image reading unit 12, and/or stores the state of the respective blocks determined by the state determining units 17, in a storage area. The storage unit 21 is a large-capacity storage device such as a Hard Disk Drive (HDD).

The configuration of the image forming apparatus 10 has been described above.

Reference of Information of Image Forming Apparatus

Next, remote referencing of the information on the image forming apparatus 10 will be described.

A user can execute a query with respect to the image forming apparatus 10 from the external device 200 such as a PC on the network and can refer to the information on the image forming apparatus 10.

In addition, FIG. 2 illustrates a screen example when referring to the information on the image forming apparatus 10 displayed on the external device 200.

The query for the information is performed by a printer driver or a dedicated management tool, which is executed on the external device 200 and corresponds to the image forming apparatus 10.

Additionally, the information of the image forming apparatus 10 is, for example, shown as follows.

(1) The configuration of the image forming apparatus 10: such as whether or not a paper sheet cassette is equipped, whether or not a finisher is equipped; paper sheet information (such as a paper sheet size, a type of paper sheet, and maximum loading capacity).

(2) The state of the movable member, such as opening and closing of the covers, attachment and removal of the cassettes.

(3) The state of the respective blocks: such as whether or not the blocks are in the power-saving state, whether or not errors are occurring, a paper sheet-remaining amount, and a toner-remaining amount.

Furthermore, it is important to remotely refer to the information of the image forming apparatus 10. Because maintenance services, such as a toner automatic ordering service and a failure detection service for the image forming apparatus 10, are performed in response to the information of the image forming apparatus 10 by the image forming apparatus 10 remotely monitored.

In addition, it has been considered that a user remotely refers to the information of the image forming apparatus 10 or remotely operates the image forming apparatus 10 with a tablet type computer or a similar computer individually owned by the user. Also from the aspect described above, it has become important that the information of the image forming apparatus 10 can be remotely referenced.

The remote referencing of the information on the image forming apparatus 10 has been described above.

Problems at Time of Reference

Next, the problem, which has conventionally occurred when a typical image forming apparatus is in a power-saving mode, will be described.

The problem, here, is that when the typical image forming apparatus is in the power-saving mode, and a user changes a state of a block of the image forming apparatus by physically changing the state of the block, the changed state is not reflected as the information of the image forming apparatus referenced from an external device.

Here, the change of the state of the block is, for example, that when the image forming apparatus is in the power-saving mode, the user replenishes paper sheets to a paper sheet cassette of the image forming apparatus, or replaces a toner cartridge, or removes a stapler of a finisher.

These changes of the state described above occur, for example, as follows:

(1) The user takes off the paper sheet in the paper sheet cassette for using as memo paper;

(2) The user switches toner cartridges between two image forming apparatuses because the toner of the other image forming apparatus, which the user wants to use, is used up; or (3) The user temporarily borrows a stapler to use the stapler for other image forming apparatus.

FIG. 3A illustrates the screen example of the management tool when the change of the state is reflected. Further, FIG. 3B illustrates the screen example of the management tool when the change of the state is not reflected.

In the typical image forming apparatus according to the related art in the power-saving mode, even the above-described change of the state occurs, since the information of the typical image forming apparatus referenced from the external device is not updated as the screen example of FIG. 3B, users other than the user who has performed the change of the state cannot appropriately grasp the state of the typical image forming apparatus remotely.

The problem, which has conventionally occurred when a typical image forming apparatus was in a power-saving mode, has been described above.

Solution to Problem

Next, a solution to the above-described problem, which is employed in the image forming apparatus 10 according to the embodiment, will be described.

In the embodiment, it is focused that, in order for a user to change a state of a block, for example, the operation of opening of a cover (movable member) covering the block is always performed.

Then, even in the power-saving mode, the sensor (the user operation detecting unit 16) located at the movable member and the control unit 11, which determines at which block a state might have been changed by receiving an output from the sensor, are energized.

Then, in a user operation detecting unit 16, when an operation of the user to the movable member corresponding to the user operation detecting unit 16 is detected, electric power is supplied only to the state determining unit 17 of the block corresponding to the movable member. Accordingly, the state determining unit 17 determines the state of the block where the state might have been changed.

Figure 4:
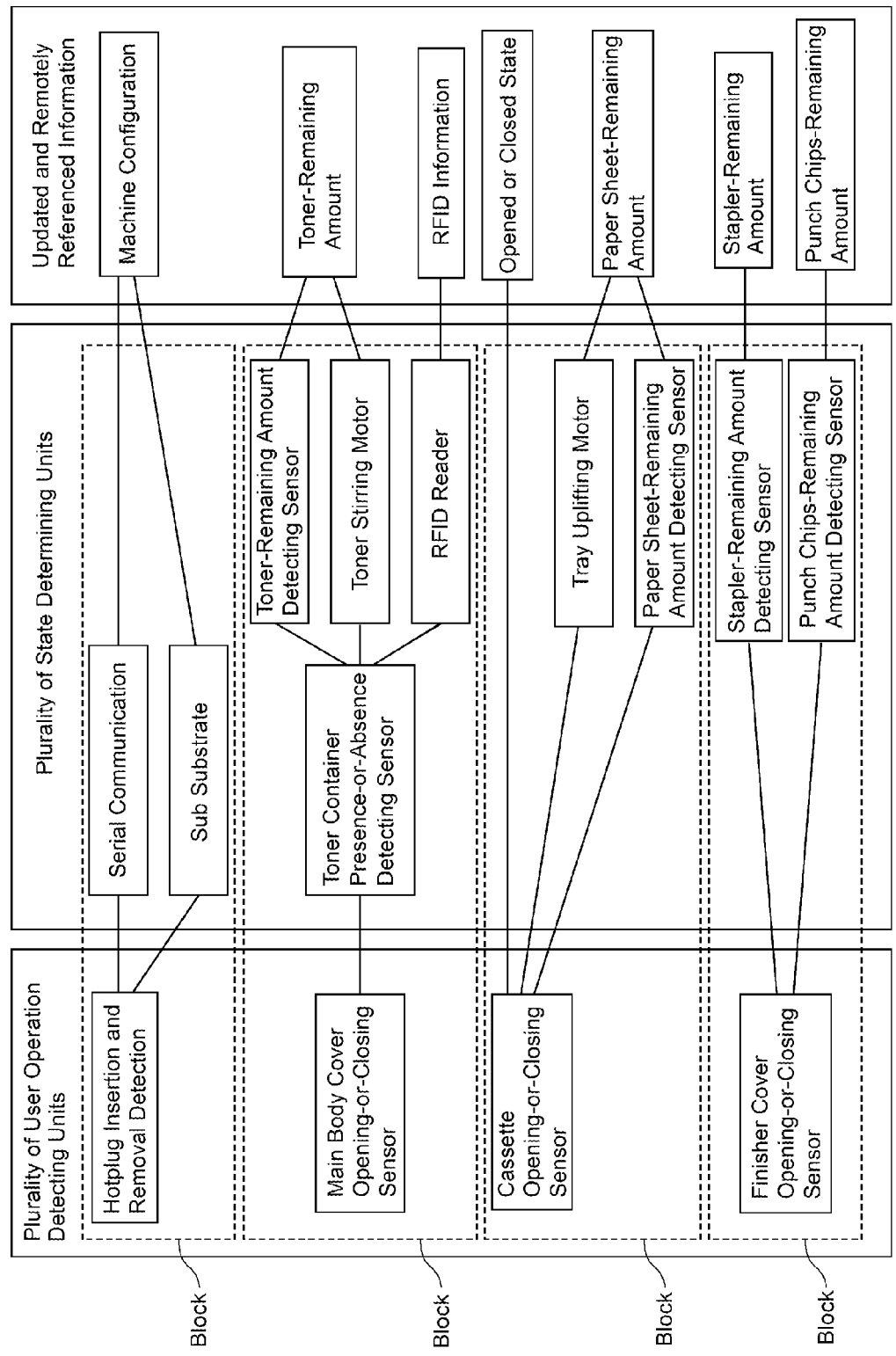
FIG. 4 illustrates an exemplary correspondence between respective blocks, respective user operation detecting units, respective state determining units, and items of information of the image forming apparatus that is remotely referenced, in the image forming apparatus according to the embodiment.

In the image forming apparatus 10, FIG. 4 illustrates an exemplary correspondence between the respective blocks, the respective user operation detecting units 16, the respective state determining units 17, and items of the information of the image forming apparatus 10 remotely referenced.

For example, in the block regarding a toner container as the second top block, when a main body cover, which a user opens and closes to access to the toner container, is regarded as the movable member, a main body cover opening-or-closing sensor corresponds to the user operation detecting unit 16. Furthermore, a toner container presence-or-absence detecting sensor, a toner-remaining amount detecting sensor, a toner stirring motor, and a Radio Frequency Identification (RFID) reader correspond to the state determining units 17.

Then, when remotely referencing, the information is referenced as "toner-remaining amount" and "RFID information."

Thus, in the image forming apparatus 10, in addition to the normal mode and the power-saving mode, the intermediate state is configured. In the intermediate state, with a specific user operation as a trigger energizes only the state determining unit 17 of the block where the state may be changed, for determining the state. This ensures that the image forming apparatus 10 transitions to the intermediate state even when the user changes the state of the block in the power-saving mode, and the information appropriately reflecting the current state of the image forming apparatus 10 is appropriately provided with respect to a remote reference.

Therefore, in the image forming apparatus 10, when the change of the state of the block by the user occurs in the power-saving mode, the information of the image forming apparatus 10 referenced from the external device 200 is updated as the screen example of FIG. 3A.

Furthermore, in the normal mode, the state determining unit 17 of the block where the state may be changed is energized. Thus, when a change of the state of the block by the user occurs, the information of the image forming apparatus 10 referenced from the external device 200 is updated as the screen example of FIG. 3A.

The solution to the above-described problem, which is employed in the image forming apparatus 10 according to the embodiment, has been described above.

Providing Method of Information

Next, it will be described how information of an updated state of a block will be provided to an external device 200 in the image forming apparatus 10. In addition, here, assume three providing methods as follows.

(1) Installation of State Management Server 100

Figure 5:
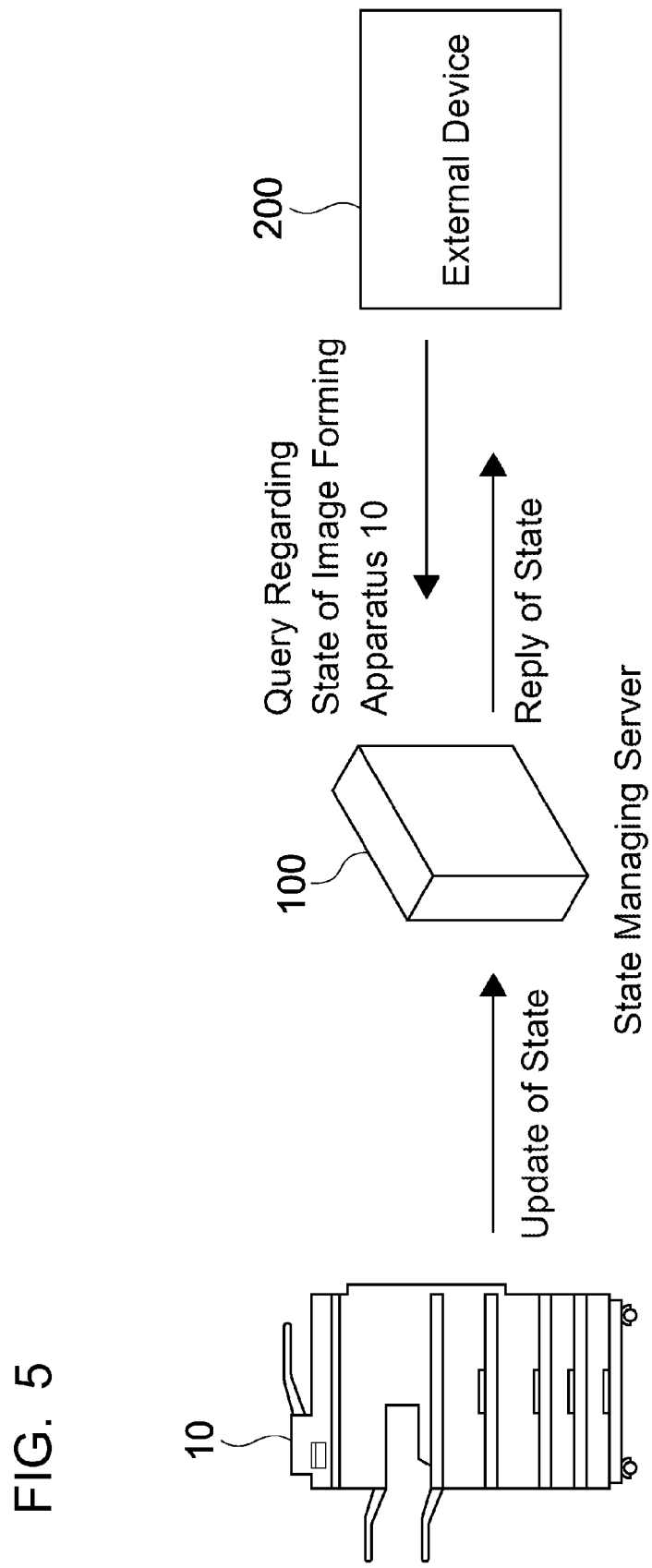
FIG. 5 illustrates a situation where a state management server for providing information on a state of the image forming apparatus is installed outside the image forming apparatus and replies to a query for the state from an external device.

First, the first providing method is a method where the state management server 100 for providing the information on the state of the image forming apparatus 10 is installed outside the image forming apparatus 10. FIG. 5 illustrates a situation where the state management server 100 for providing the information on the state of the image forming apparatus 10 is installed outside the image forming apparatus 10 to reply to a query for the state from the external device 200. The combination of the image forming apparatus 10 and the state management server 100 are referred to as device management system.

The image forming apparatus 10 transmits the information on the state of the block, where the state is changed by a user operation, to the state management server 100 by a push-based communication as update of the state only when there was the user operation.

The state management server 100 constantly holds the latest information on the state of the image forming apparatus 10 and transmits a reply to a query every time the query is received from the external device 200.

Additionally, since the state management server 100 can be constituted by a general Personal Computer (PC) or a similar computer, detailed descriptions on the configuration will be omitted.

Further, a state management system can be constituted by the image forming apparatus 10 and the state management server 100.

Thus, only when the user operation is performed, the image forming apparatus 10 transitions to the intermediate mode and notifies the state of the block, where the user operation is performed, to the state management server 100. The image forming apparatus 10 does not transition from the power-saving mode to the other mode with the query from the external device 200 as a trigger. Thus, electric power consumption can be reduced by the lengthened period of the power-saving mode.

(2) Inclusion of State Managing Unit

Figure 6:
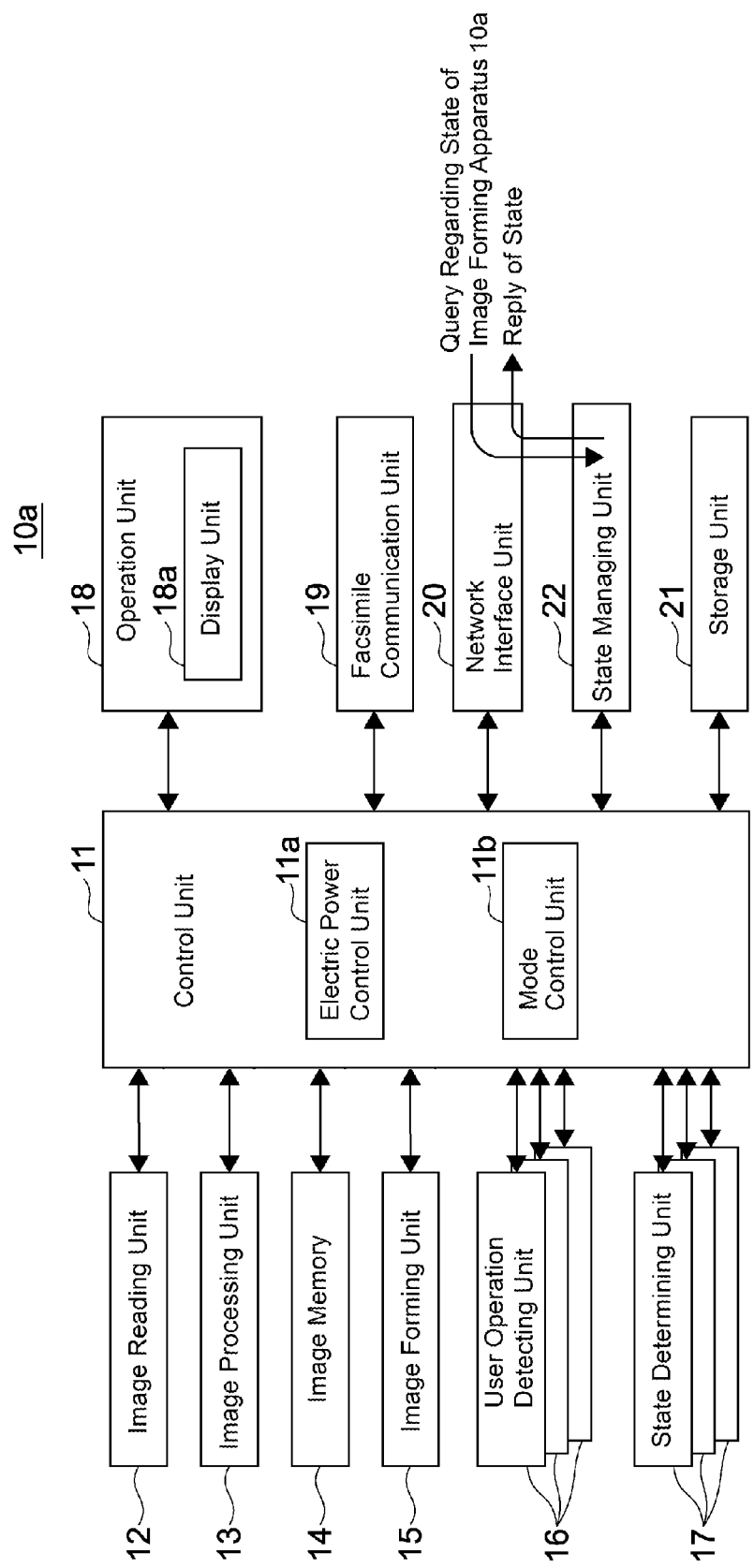
FIG. 6 illustrates a configuration of another image forming apparatus including a state managing unit according to the embodiment.

The next providing method is a method where the state managing unit for providing information on the state of the image forming apparatus is included inside the image forming apparatus. FIG. 6 illustrates a configuration of an image forming apparatus 10a including a state managing unit 22. The configuration of the image forming apparatus 10a is similar to the image forming apparatus 10 illustrated in FIG. 1 except the state managing unit 22.

The state managing unit 22 is supplied with electric power even in the power-saving mode along with the network interface unit 20 and has the identical function as the above-described state management server 100, which replies to a query from the external device 200.

This method can eliminate the labor of installation of the state management server 100 outside the image forming apparatus 10a.

(3) Broadcasting Update of State

Figure 7:
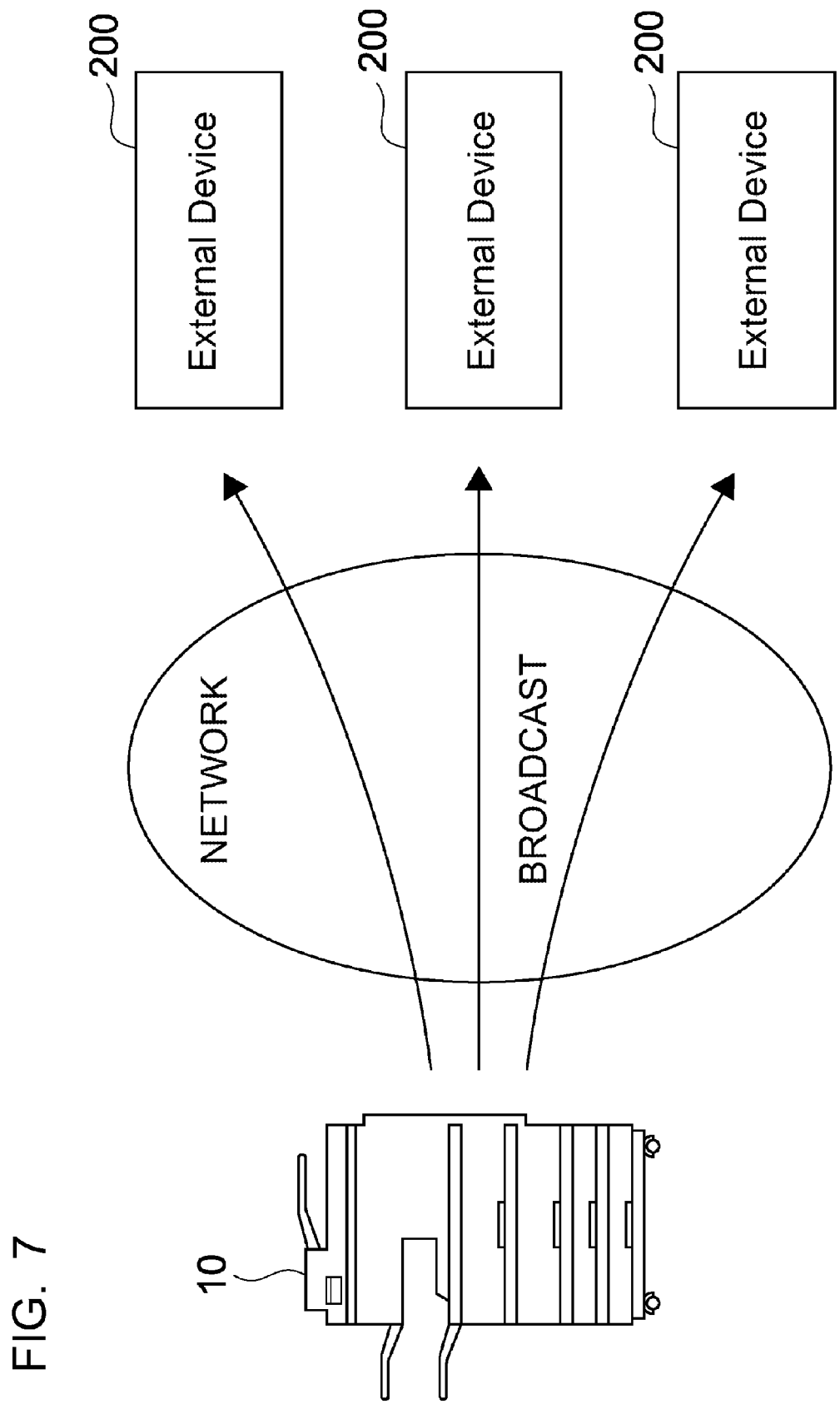
FIG. 7 illustrates a situation where the image forming apparatus according to the embodiment broadcasts a state of a block to which a change is performed by a specific user operation as a update message of the state on a network.

The last providing method is a method where the image forming apparatus 10 broadcasts determined results of a state as an update message of the state on the network every time the state of the block is changed by the user operation. FIG. 7 illustrates a situation where the image forming apparatus 10 broadcasts the state of the block, to which the change is performed by the user operation, as the update message of the state on the network.

This method eliminates the need for locating the state management server 100 or the state managing unit 22 unlike the above-described two methods. However, since the broadcast is performed only when the user operation is performed, the external device 200 that is not activated at that time cannot receive the update of the state.

Here, the user operation for the change of the state includes both of: a series of user operations to the above-described movable members, and the user operations other than the series of user operations. In the example illustrated in FIG. 4, when paper sheets are replenished during the opening and closing of the sheet feed cassette, the series of user operations is the user operation for performing the change of the state. Further, when a toner container is replaced during the opening and closing of the main body cover, the operation other than the series of user operations is the user operation for performing the change of the state.

It has been described above how the information of the updated state of the block is provided to the external device 200 in the image forming apparatus 10.

Flow of Processes

Figure 8:
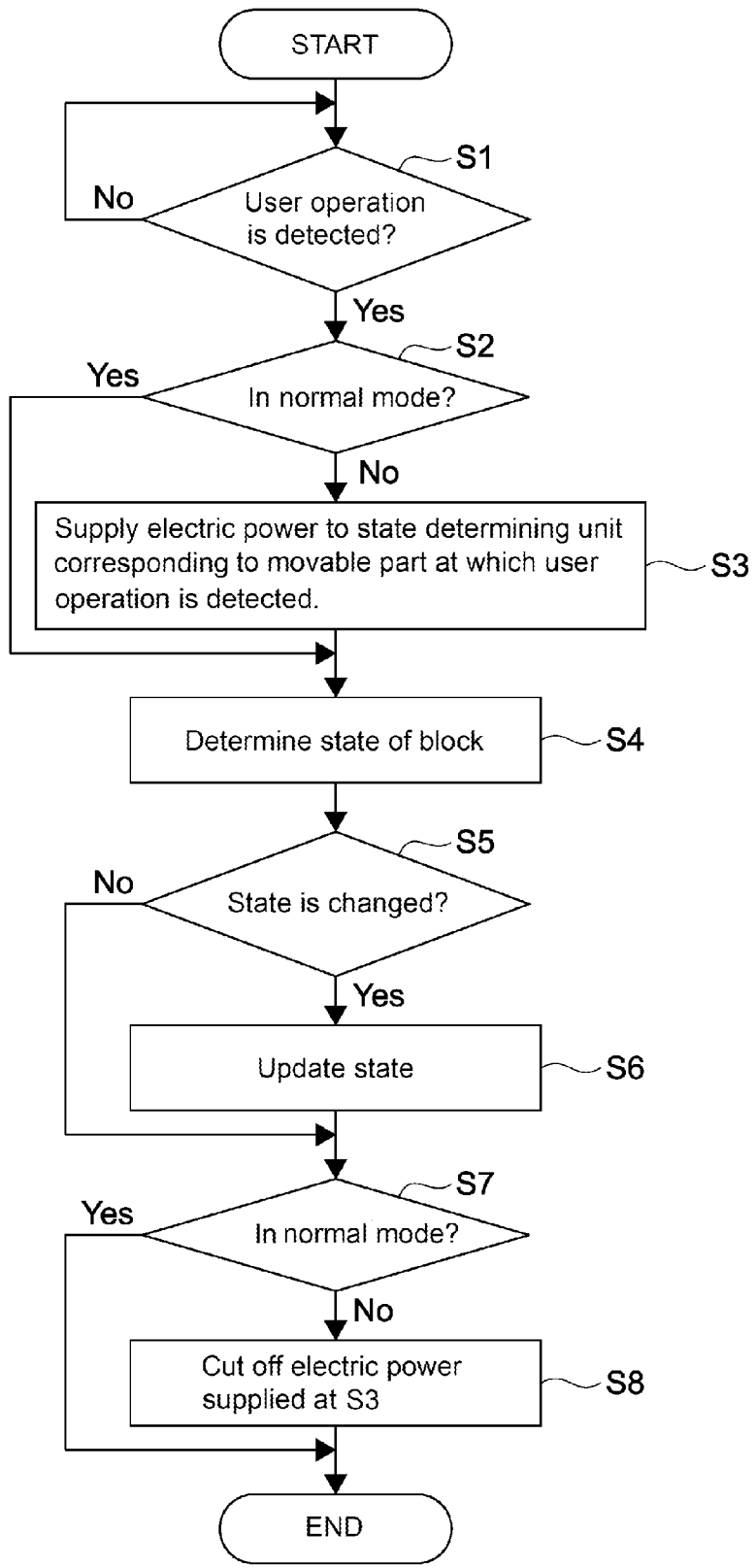
FIG. 8 illustrates a flow of processes in each of the image forming apparatuses.

Next, a flow of the processes in the image forming apparatuses 10 and 10a according to the embodiment will be described. FIG. 8 is a flowchart for describing the flow of the processes in the image forming apparatuses 10 and 10a according to the embodiment.

First, the control unit 11 determines whether or not a specific user operation to the movable member is detected by the user operation detecting unit 16 (Step S1).

When the specific user operation is not detected (No in Step S1), the control unit 11 repeats the process of Step S1.

When the specific user operation is detected (Yes in Step S1), the control unit 11 queries to the mode control unit 11b and determines whether or not the current mode of the image forming apparatuses 10 and 10a is the normal mode (Step S2).

When the current mode of the image forming apparatuses 10 and 10a is not the normal mode (No in Step S2), the control unit 11 outputs an instruction to the electric power control unit 11a and causes the electric power control unit 11a to supply electric power to the state determining unit 17 corresponding to the movable member where the specific user operation is detected (Step S3). The process of Step S3 causes the mode of the image forming apparatuses 10 and 10a to transition to the intermediate mode.

When the current mode of the image forming apparatuses 10 and 10a is the normal mode (Yes in Step S2), since the electric power is already supplied to all the state determining units 17, it is not necessary to start supplying the electric power again. Thus, control of electric power supply to the state determining unit 17, which corresponds to the movable member where the specific user operation is detected, is not performed.

Next, the state determining unit 17, where supply of the electric power is started at Step S3, determines the state of the assigned block in response to the instruction from the control unit 11 (Step S4).

Subsequently, the control unit 11, with regard to the determined block, compares the currently determined state with the state stored in the storage unit 21. Then, the control unit 11, with regard to the determined block, determines whether or not the state is changed (Step S5).

When the state is not changed (No in Step S5), the control unit 11 does nothing because there is no need to additionally notify an update of the state outside.

When the state is changed (Yes in Step S5), the control unit 11, by any of the above-described three methods, notifies the updated information on the block of the image forming apparatuses 10 and 10a (Step S6). At this time, the control unit 11 updates the state stored in the storage unit 21.

Next, the control unit 11 determines whether or not the current mode of the image forming apparatuses 10 and 10a is the normal mode (Step S7).

When the current mode of the image forming apparatuses 10 and 10a is the normal mode (YES in Step S7), the control unit 11 does not perform additional process with regard to electric power supply, because the determination of the state with respect to the block, where the specific user operation is performed, is executed when the electric power is originally being supplied.

When the current mode of the image forming apparatuses 10 and 10a is not the normal mode (No in Step S7), the control unit 11 cuts off the supply of the electric power to the state determining unit 17, where the electric power is supplied in the intermediate mode, so as to return to the power-saving mode (Step S8), because the determination of the state with respect to the block, where the specific user operation is performed, was executed by causing the image forming apparatuses 10 and 10a to transition to the intermediate mode from the state originally in the power-saving mode.

When the state is changed with regard to the block corresponding to the specific user operation in the normal mode and the power-saving mode, the process illustrated in FIG. 8 updates the information of the image forming apparatuses 10 and 10a referenced from the external devices 200 as the screen example in FIG. 3A.

Furthermore, the process illustrated in FIG. 8 can be independently executed for each of the blocks. In this case, even when specific user operations with respect to the plurality of blocks occur in the identical time period, the image forming apparatuses 10 and 10a can notify the information on the respective blocks.

In this case, when the image forming apparatuses 10 and 10a transitions to the intermediate mode due to a specific user operation with respect to a block, even if a specific user operation with respect to the other block occurs, the information of the image forming apparatuses 10 and 10a referenced from the external devices 200 is updated as the screen example in FIG. 3A corresponding to the change of the state regarding the respective blocks.

Furthermore, immediately before the process of Step S7, the control unit 11 may determine whether or not the user operation to be lastly performed (such as the insertion operation of the part, the closing operation of the toner cover, the closing operation of the main body cover, the closing operation of the sheet feed cassette, and the closing operation of the finisher) is performed among the series of user operations with respect to the movable member. When the last operation is performed, the control unit 11 proceeds to Step S7. In contrast, when the last operation is not yet performed, the control unit 11 repeats the processes from Step S4 to Step S6.

The flow of the processes in the image forming apparatuses 10 and 10a according to the embodiment has been described above.

Effect

The disclosure can appropriately detect the change by user operation in the power-saving state while reducing power consumption.

(1) When a user performs an operation physically moving a movable member during the power-saving mode, the actual state of the movable member and the information on the state of the movable member can be matched.

(2) When a user performs an operation physically moving a movable member during the power-saving mode, since the only minimum necessary portion is supplied with electric power and is activated in order for the state of the movable member to be detected, power consumption when the information on the state of the movable member is updated can be suppressed.

(3) Since the server, which holds the information on the states of the movable members and replies to the query from the management device, is located, the management device is not required to activate the devices for the respective replies, and thus the power consumption of the devices can be reduced even when the count of queries increases.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An electronic device comprising:
a plurality of blocks that each have equal to or more than two states;
a plurality of movable members located in the respective plurality of blocks and operated when the states of the plurality of blocks are changed;
a plurality of operation detecting circuits that detect the respective operations of the plurality of movable members;
a plurality of state determining circuits that determine the respective states of the plurality of blocks;
an electric power control circuit that supplies electric power to the plurality of operation detecting circuits and performs supply and cutoff of electric power to the plurality of state determining circuits; and
a control circuit that has an electric power mode:
causing the electric power control circuit to supply the electric power to the plurality of operation detecting circuits and to cut off the supply of the electric power to the respective state determining circuits, and causing the electric power control circuit to supply the electric power to the state determining circuit corresponding to the movable member where the operation is detected in addition to the plurality of operation detecting circuits when an operation to the movable member is detected by the operation detecting circuit;

a communication circuit that communicates with an external device outside of the electronic device; and a state managing circuit that stores information on the respective states of the plurality of blocks and replies the state of a queried block for the query from the external device; wherein the control circuit updates the state information of the block stored in the state managing circuit using the information of the determined state when the state of the block determined by the state determining circuit is different from the state information of the block stored in the state managing circuit.

2. An electronic device comprising:

a plurality of blocks that each have equal to or more than two states;

a plurality of movable members located in the respective plurality of blocks and operated when the states of the plurality of blocks are changed;

a plurality of operation detecting circuits that detect the respective operations of the plurality of movable members;

a plurality of state determining circuits that determine the respective states of the plurality of blocks;

an electric power control circuit that supplies electric power to the plurality of operation detecting circuits and performs supply and cutoff of electric power to the plurality of state determining circuits; and a control circuit that has an electric power mode:
  causing the electric power control circuit to supply the electric power to the plurality of operation detecting circuits and to cut off the supply of the electric power to the respective state determining circuits, and
  causing the electric power control circuit to supply the electric power to the state determining circuit corresponding to the movable member where the operation is detected in addition to the plurality of operation detecting circuits when an operation to the movable member is detected by the operation detecting circuit;

a communication circuit that communicates with a server that replies a state of a queried block for a query from outside the electronic device; and a storage circuit that stores information on the respective states of the plurality of blocks; wherein the control circuit transmits the information of the detected state to the server when the state of the block determined by the state determining circuit is different from the state information of the block stored in the storage circuit, the server holding the information on the detected state of the block, transmitted from the control circuit, and every time a query is received from outside the electronic device transmits a reply as to the state of the queried block.

3. An electronic device comprising:

a plurality of blocks that each have equal to or more than two states;

a plurality of movable members located in the respective plurality of blocks and operated when the states of the plurality of blocks are changed;

a plurality of operation detecting circuits that detect the respective operations of the plurality of movable members;

a plurality of state determining circuits that determine the respective states of the plurality of blocks;

an electric power control circuit that supplies electric power to the plurality of operation detecting circuits and performs supply and cutoff of electric power to the plurality of state determining circuits; and a control circuit that has an electric power mode:
  causing the electric power control circuit to supply the electric power to the plurality of operation detecting circuits and to cut off the supply of the electric power to the respective state determining circuits, and
  causing the electric power control circuit to supply the electric power to the state determining circuit corresponding to the movable member where the operation is detected in addition to the plurality of operation detecting circuits when an operation to the movable member is detected by the operation detecting circuit;

a communication circuit that communicates with an outside of the electronic device; and a storage circuit that stores information on the respective states of the plurality of blocks; wherein the control circuit broadcasts the information of the detected state using the communication circuit when the state of the block determined by the state determining circuit is different from the state information of the block stored in the storage circuit.

4. A device management system comprising:

an electronic device; and a server; wherein the electronic device includes:
  a plurality of blocks that each have equal to or more than two states;
  a plurality of movable members located in the respective plurality of blocks and operated when the states of the plurality of block are changed;
  a plurality of operation detecting circuits that detect the respective operations of the plurality of movable members;
  a plurality of state determining circuits that determine the respective states of the plurality of blocks;
  an electric power control circuit that supplies electric power to the plurality of operation detecting circuits and performs supply and cutoff of electric power to the plurality of state determining circuits;
  a communication circuit that communicates with the server;
  a storage circuit that stores information on the respective states of the plurality of blocks; and
  a control circuit that has an electric power mode:
    causing the electric power control circuit to supply the electric power to the plurality of operation detecting circuits and to cut off the supply of the electric power to the respective state determining circuits;
    causing the electric power control circuit to supply the electric power to the state determining circuit corresponding to the movable member where the operation is detected in addition to the plurality of operation detecting circuits when an operation to the movable member is detected by the operation detecting circuit, and
    transmitting the information of the detected state to the server when the state of the block determined by the state determining circuit is different from the state information of the block stored in the storage circuit; and the server replies a state of a queried block for the query from the outside of the electronic device.

5. A non-transitory computer-readable recording medium storing a device management program for controlling an electronic device including a plurality of blocks that each have equal to or more than two states and a plurality of movable parts located in the respective plurality of blocks and operated when the states of the plurality of block are changed, the device management program causing the electronic device to execute:
- a plurality of operation detecting units that detect the respective operations of the plurality of movable parts;
- a plurality of state determining units that determine the respective states of the plurality of blocks;
- an electric power control unit that supplies electric power to the plurality of operation detecting units and performs supply and cutoff of electric power to the plurality of state determining units; and
- a control unit that has an electric power mode:
    - causing the electric power control unit to supply the electric power to the plurality of operation detecting units and to cut off the supply of the electric power to the respective state determining units, and
    - causing the electric power control unit to supply the electric power to the state determining unit corresponding to the movable part where the operation is detected in addition to the plurality of operation detecting units when an operation to the movable part is detected by the operation detecting unit;
- a communication circuit that communicates with an external device outside of the electronic device; and
- a state managing circuit that stores information on the respective states of the plurality of blocks and replies the state of a queried block for the query from the external device; wherein
- the control circuit updates the state information of the block stored in the state managing circuit using the information of the determined state when the state of the block determined by the state determining circuit is different from the state information of the block stored in the state managing circuit.

* * * * *